(12) United States Patent
Hsu (10) Patent No.: US 11,375,401 B2
(45) Date of Patent: Jun. 28, 2022

(54) NETWORK SERVICE DEVICE, SESSION MANAGEMENT DEVICE AND OPERATION METHODS THEREOF

(71) Applicant: Industrial Technology Research Institute, Hsinchu (TW)

(72) Inventor: Yu-Ching Hsu, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 21 days.

(21) Appl. No.: 16/726,810

(22) Filed: Dec. 24, 2019

(65) Prior Publication Data
US 2021/0105662 A1 Apr. 8, 2021

(30) Foreign Application Priority Data
Oct. 3, 2019 (TW) .................................. 108135816

(51) Int. Cl.
*H04W 28/06* (2009.01)
*H04W 28/24* (2009.01)
(Continued)

(52) U.S. Cl.
CPC .......... *H04W 28/06* (2013.01); *H04L 47/283* (2013.01); *H04W 24/02* (2013.01); *H04W 24/04* (2013.01); *H04W 28/0268* (2013.01); *H04W 28/04* (2013.01); *H04W 28/08* (2013.01); *H04W 28/24* (2013.01); *H04W 76/10* (2018.02)

(58) Field of Classification Search
CPC . H04W 24/02; H04W 28/08; H04W 28/0268; H04W 28/24; H04W 76/10; H04W 28/06; H04W 24/04; H04W 28/04; H04L 47/283
See application file for complete search history.

(56) References Cited

U.S. PATENT DOCUMENTS 11,297,627 B2 * 4/2022 Stathakis .............. H04L 5/0082
2018/0054765 A1 2/2018 Kim et al.
(Continued)

FOREIGN PATENT DOCUMENTS

CN 108141784 A 6/2018
CN 108307402 A 7/2018
(Continued)

OTHER PUBLICATIONS

Taiwan Patent Office, Office Action, Patent Application Serial No. 108135816, dated Jul. 31, 2020, Taiwan.
(Continued)

*Primary Examiner* — Syed Ali (57) ABSTRACT

A network service device includes a storage module, a communication module and a processing module. The storage module stores a ultra-reliable low-latency communication (URLLC)-compliant message. The processing module is coupled to the storage module and the communication module. The processing module receives a connection establish request message from a session management device through the communication module, and establishes a session according to the connection establish request message. The processing module provides the URLLC-compliant message to the session management device through the communication module.

12 Claims, 8 Drawing Sheets

(51) Int. Cl.
*H04W 28/04* (2009.01)
*H04W 28/02* (2009.01)
*H04W 28/08* (2009.01)
*H04W 24/02* (2009.01)
*H04W 24/04* (2009.01)
*H04W 76/10* (2018.01)
*H04L 47/283* (2022.01)

(56) References Cited

U.S. PATENT DOCUMENTS

| | | | |
|---|---|---|---|
| 2018/0191563 A1 | 7/2018 | Farmanbar et al. | |
| 2019/0075431 A1 | 3/2019 | Albasheir et al. | |
| 2019/0110293 A1* | 4/2019 | Li | H04W 36/30 |
| 2019/0215863 A1* | 7/2019 | Kim | H04W 36/0027 |
| 2019/0313287 A1* | 10/2019 | Li | H04W 72/1242 |
| 2019/0320436 A1* | 10/2019 | Han | H04L 5/0094 |
| 2020/0170052 A1* | 5/2020 | Yang | H04W 24/02 |
| 2021/0037588 A1* | 2/2021 | Zhu | H04W 36/26 |
| 2021/0058833 A1* | 2/2021 | Basu Mallick | H04W 76/19 |
| 2021/0084582 A1* | 3/2021 | Li | H04W 24/08 |
| 2021/0089637 A1* | 3/2021 | Cummins | G06F 21/32 |
| 2021/0212021 A1* | 7/2021 | Youn | H04W 60/00 |
| 2022/0007444 A1* | 1/2022 | Kawasaki | H04W 76/34 |
| 2022/0086684 A1* | 3/2022 | Claeson | H04W 24/04 |
| 2022/0104241 A1* | 3/2022 | Zou | H04L 5/0051 |

FOREIGN PATENT DOCUMENTS

| | | |
|---|---|---|
| CN | 108337705 A | 7/2018 |
| GB | 2558585 A | 7/2018 |
| TW | I655877 B | 4/2019 |
| WO | WO2017097227 A1 | 6/2017 |
| WO | WO2017167237 A1 | 10/2017 |
| WO | WO2017219973 A1 | 12/2017 |
| WO | WO2018059514 A1 | 4/2018 |
| WO | WO2018127147 A1 | 7/2018 |
| WO | WO2019030390 A1 | 2/2019 |

OTHER PUBLICATIONS

Basta, Arsany et al. "A virtual SDN-enabled LTE EPC architecture: A case study for S-/P-gateways functions", IEEE SDN Future Netw. Services, 2013, pp. 1-7, IEEE, US.

Heinonen, Johanna et al. "Dynamic tunnel switching for SDN-based cellular core networks", 2014, pp. 27-32, ACM, US.

Garcia-Perez, Cesar A. and Pedro Merino. "Enabling low latency services in standard LTE networks" IEEE 1st International V.1.1 9044D-A26732-US 3/3 Workshops on Foundations and Applications of Self* Systems, 2016, pp. 248-255, IEEE, US.

Sama, Malla Reddy et al. "Reshaping the Mobile Core Network via Function Decomposition and Network Slicing for the 5G Era" IEEE Wireless Communications and Networking Conference WS 6 : IEEE WCNC'2016 Workshop on 5G & Vertical Industry—WS 11 : IEEE WCNC'2016 Workshop on the Tactile Internet: Enabling Technologies and Applications, 2016, 7 pages, IEEE, US.

Nguyen, Van-Giang et al. "SDN/NFV-Based Mobile Packet Core Network Architectures: A Survey" IEEE Communications Surveys & Tutorials, vol. 19, No. 3, Third Quarter 2017, pp. 1567-1602, IEEE, US.

Page, Jeremy et al., "Software-Defined Networking for Low-Latency 5G Core Network", 2016, pp. 1-7, ICMCIS.

Trivisonno, R. et al., "Towards Zero Latency Software Defined 5G Networks" IEEE ICC 2015—Workshop on Heterogeneous Converged Networks, 2015, pp. 2566-2571, IEEE, US.

Taiwan Patent Office, Office Action, Patent Application Serial No. 108135816, dated Jun. 30, 2021, Taiwan.

* cited by examiner

NETWORK SERVICE DEVICE, SESSION MANAGEMENT DEVICE AND OPERATION METHODS THEREOF

CROSS-REFERENCE TO RELATED APPLICATION

The present application is based on, and claims priority from, Taiwan Application Serial Number 108135816, filed Oct. 3, 2019, the disclosure of which is hereby incorporated by reference herein in its entirety.

TECHNICAL FIELD

The present disclosure relates to a network service device, a session management device and operation methods thereof.

BACKGROUND

With the advancement of technology, the 5th generation mobile networks (5G) system standard and organization specification requires that the latency of end-to-end is 10 milliseconds (ms). The 3rd generation partnership project (3GPP) system further defines the latency of a user plane function (UPF) device as 1 ms.

Currently, network operators may implement a user plane function device through software-defined networking (SDN) and network function virtualization (NFV) to lower costs and provide flexibility of use. However, the use of network function virtualization may reduce costs, but the virtual machine thereof has performance limitations. Accordingly, it may not able to satisfy the need for a latency of the user plane function device of 1 ms. Therefore, how to effectively increase the data-processing speed and decrease the latency time has become an important issue.

SUMMARY

The present disclosure provides a network service device, a session management device and operation methods thereof, thereby effectively providing the information of the network service device, and increasing the data-processing speed and decreasing the latency time.

The present disclosure provides a network service device, which includes a storage module, a communication module and a processing module. The storage module stories an ultra-reliable low-latency communication (URLLC)-compliant message, wherein the URLLC-compliant message indicates that the network service device has a capability of URLLC. The processing module is coupled to the storage module and the communication module. The processing module receives a connection establish request message from a session management device through the communication module and establishes a session according to the connection establish request message. The processing module provides the URLLC-compliant message to the session management device through the communication module.

In addition, the present disclosure provides an operation method of a network service device, which includes the following steps. An ultra-reliable low-latency communication (URLLC)-compliant message is stored, wherein the URLLC-compliant message indicates that the network service device has a capability of URLLC. A connection establish request message is received from a session management device and a session is established according to the connection establish request message. The URLLC-compliant message is provided to the session management device.

In addition, the present disclosure provides a session management device, which includes a communication module and a processing module. The processing module is coupled to the communication module. The processing module is connected to a plurality of network service devices through the communication module and obtains state messages of the network service devices, wherein at least one of the state messages of the network service devices includes an ultra-reliable low-latency communication (URLLC)-compliant message and the URLLC-compliant message indicates that the network service device has URLLC capability. The processing module receives a service request of user equipment and selects one of the network service devices to serve the service request according to the service request and the state messages of the network service devices.

In addition, the present disclosure provides an operation method of a session management device, which includes the following steps. The session management device is connected to a plurality of network service devices and obtains state messages of the network service devices, wherein at least one of the state messages of the network service devices includes an ultra-reliable low-latency communication (URLLC)-compliant message and the URLLC-compliant message indicates that the network service device has a capability of URLLC. A service request of user equipment is received. One of the network service devices is selected to serve the service request according to the service request and the state messages of the network service devices.

BRIEF DESCRIPTION OF DRAWINGS

The present disclosure may be more fully understood by reading the subsequent detailed description and examples with references made to the accompanying drawings, wherein.

DETAILED DESCRIPTION OF DISCLOSED EMBODIMENTS

Technical terms of the disclosure are based on general definition in the technical field of the disclosure. If the disclosure describes or explains one or some terms, definition of the terms is based on the description or explanation of the disclosure. Each of the disclosed embodiments has one or more technical features. In possible implementation, a person skilled in the art would selectively implement all or some technical features of any embodiment of the disclosure or selectively combine all or some technical features of the embodiments of the disclosure.

In each of the following embodiments, the same reference number represents the same or similar element or component.

Figure 1:
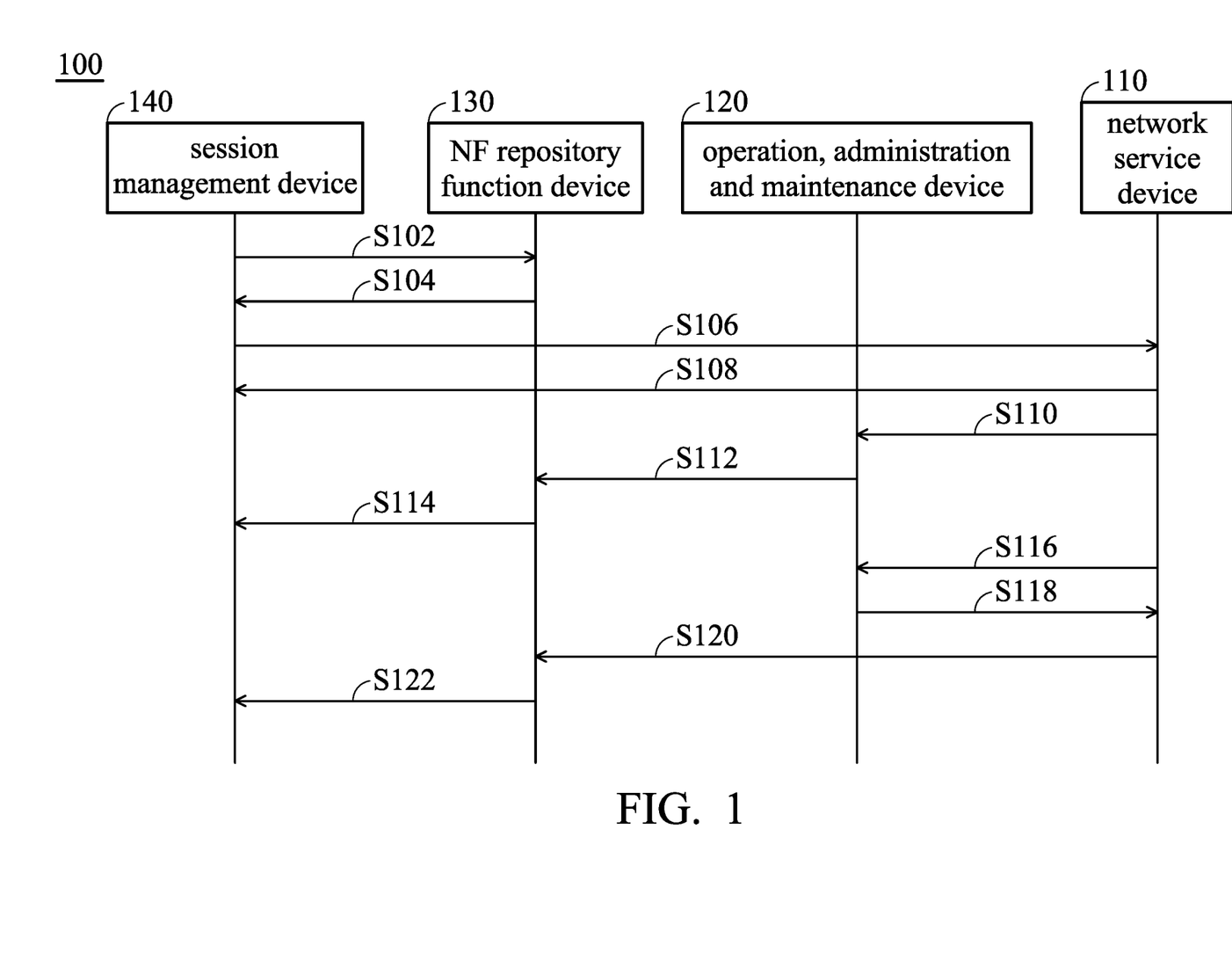
FIG. 1 is a schematic view of an operation of a 5G network system architecture according to an embodiment of the present disclosure.

FIG. 1 is a schematic view of an operation of a 5G network system architecture according to an embodiment of the present disclosure. Please refer to FIG. 1. The 5G network system architecture 100 at least includes a network service device 110, an operation, administration and maintenance (OAM) device 120, an NF repository function (NRF) device 130 and a session management device 140.

In addition, it should be understood that although not shown in FIG. 1, the 5G network system architecture 100 may further include other components, such as user equipment (UE), a (radio)access node ((R)AN) device, an access and mobility management function (AMF) device, a policy control function (PCF) device, a data network (DN) device, an application function (AF) device, a network slice selection function (NSSF) device, an authentication server function (AUSF) device, a unified data management (UDM) device, a network exposure function (NEF) device, etc. The user equipment may be connected to (radio)access node ((R)AN) device and serviced by a network function responsible for different business serves in 5G network to communicate with other devices of the data network device. Refer to "3GPP TS 23.501 V0.1.1" for the basic specifications and definitions of a 5G network.

In FIG. 1, the network service device 110 is, for example, a user plane function (UPF) device, and the session management device 140 is, for example, a session management function (SMF) device. In the embodiment, the network service device 110 is, for example, the user plane function device implemented in a way that is hardware-based, so as to increase the data-processing speed. When the network service device 110 is the user plane function device implemented in a way that is hardware-based, the network service device 110 may store an ultra-reliable low-latency communication (URLLC)-compliant message. The URLLC-compliant message indicates that the network service device 100 has a capability of URLLC. i.e., the network service device 110 has a characteristic of a hardware message. In addition, when the network service device is the user plane function device implemented in a way that is software-based, the network service device may not store the URLLC-compliant message.

In step S102, the session management device 140 sends a subscription notification to the NF repository function device 130. In step 104, the NF repository function device 130 transmits the information of network service device 110 to the session management device 140 in response to the subscription notification. In step S106, the session management device 140 may send a connection establish request message to the network service device 110 according to the information of the network service device 110, so that the session management device 140 is connected to the network service device 110.

In step S108, the network service device 110 provides the stored URLLC-compliant message to the session management device 140. In the embodiment, after the session management device 140 is connected to the network service device 110, the session management device 140 directly exchanges, for example, the URLLC-compliant message through a N4 interface between the session management device 140 and the network service device to obtain the URLLC-compliant message included in the network service device 110.

In step S110, the network service device 110 may send a registration request to register with the operation, administration and maintenance device 120, and provides the URLLC-compliant message stored in the network service device 110 to the operation, administration and maintenance device 120. In step S112, the operation, administration and maintenance device 120 provides the URLLC-compliant message of the network service device 110 to the NF repository function device 130. In step S114, the NF repository function device 130 provides the URLLC-compliant message of the network service device 110 to the session management device 140, so that the session management device 140 may obtain the URLLC-compliant message of the network service device 110.

In step S116, the network service device 110 may send a registration request to register with the operation, administration and maintenance device 120. In step S118, the operation, administration and maintenance device 120 transmits a network address to the network service device 110 in response the registration request, so that the network service device 110 obtains the network address. In step S120, the network service device 110 sends a registration request according to the network address to register with the NF repository function device 130, and provides the URLLC-compliant message stored in the network service device 110 to the NF repository function device 130. In step S122, the NF repository function device 130 provides the URLLC-compliant message to the session management device 140, so that the management device 140 obtains the URLLC-compliant message of the network service device 110.

As can be seen from the above description, when the network service device 110 stores the URLLC-compliant message, the session management device 140 may obtain the URLLC-compliant message of the network service device 110 through the network service device 110, the operation, administration and maintenance device 120 or the NF repository function device 130. Therefore, the convenience of use is increased. In addition, the session management device 140 may obtain the URLLC-compliant message, and may further obtain other messages with basic specifications and definitions of the network service device 110.

Figure 2:
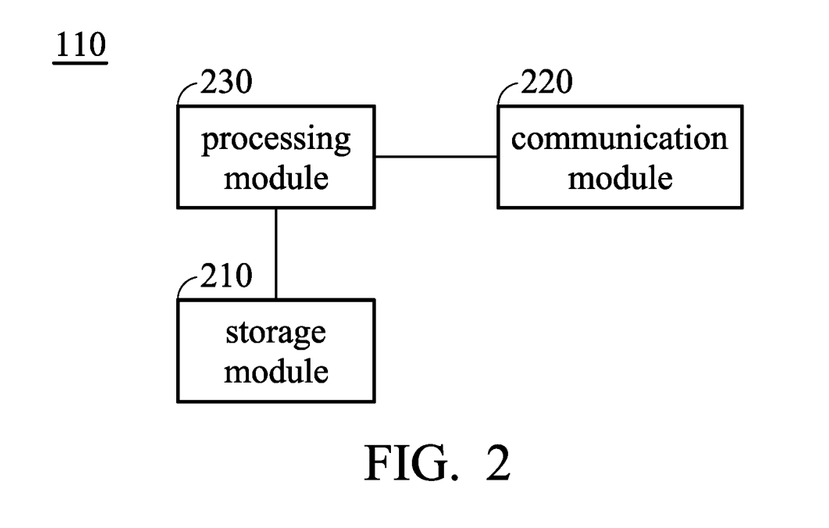
FIG. 2 is a schematic view of a network service device according to an embodiment of the present disclosure.

FIG. 2 is a schematic view of a network service device according to an embodiment of the present disclosure. Please refer to FIG. 2. The network service device 110 may include a storage module 210, a communication module 220 and a processing module 230. The storage module 210 may store the URLLC-compliant message. The URLLC-compliant message indicates that the network service device 110 has URLLC capability, and the network service device 110 is the network service device implemented in a way that is hardware-based. In the embodiment, the storage module 210 may be a random access memory (RAM), a read-only memory (ROM), a hard disk, a solid-state disk (SSD), etc.

The communication module 220 may be a signal transceiver for signal and data transmission with the session management device 140, the operation, administration and maintenance device 120 and the NF repository function device 130 as shown in FIG. 1.

The processing module 230 may be implemented by one or more programmable units and circuits having a storage function, such as a microprocessor, a microcontroller, a digital signal processing (DSP) chip, and a field programmable gate array (FPGA), etc. The processing module 230 may also be implemented by different electronic devices or integrated circuits (ICs), and the function implemented by the processing module 230 may be implemented by hardware and software.

The processing module 230 is coupled to the storage module 210 and the communication module 220. The processing module 230 receives a connection establish request message from a session management device 140 through the communication module 220, and establishes a session according to the connection establish request message. The processing module 230 provides the URLLC-compliant message to the session management device 140 through the communication module 220. In the embodiment, after the session management device 140 is connected to the network service device 110, the session management device 140 may directly exchange the URLLC-compliant message stored in the storage module 210 through the N4 interface between the session management device 140 and the network service device 110, so that the session management device 140 obtains the URLLC-compliant message of the network service device 110.

In one embodiment, the processing module 230 registers with the operation, administration and maintenance device 120 through communication module 220. Then, after the network service device 110 and the operation, administration and maintenance device120 complete the registration, the processing module 230 provides the URLLC-compliant message stored in the storage module 210 to the operation, administration and maintenance device 120 through the communication module 220, so that the operation, administration and maintenance device 120 transmits the URLLC-compliant message to the session management device 140 through the NF repository function device 130. Accordingly, the session management device 140 obtains the URLLC-compliant message of the network service device 110.

In one embodiment, after the network service device 110 and the operation, administration and maintenance device 120 complete the registration, the operation, administration and maintenance device 120 provides a network address to the processing module 230. After the processing module 230 obtains the network address, the processing module 230 registers with the NF repository function device 130 according to the network address.

After the network service device 110 and the NF repository function device 130 complete the registration, the processing module 230 provides the URLLC-compliant message to the NF repository function device 130 through the communication module 220, so that the NF repository function device 130 transmits the URLLC-compliant message to the session management device 140. Accordingly, the session management device 140 obtains the URLLC-compliant message of the network service device 110.

As can be seen from the above description, the network service device 110 may directly provide the URLLC-compliant message to the session management device 140, and may provide the URLLC-compliant message to the session management device 140 through the operation, administration and maintenance device 120 or the NF repository function device. Therefore, the convenience of use is increased.

Figure 3:
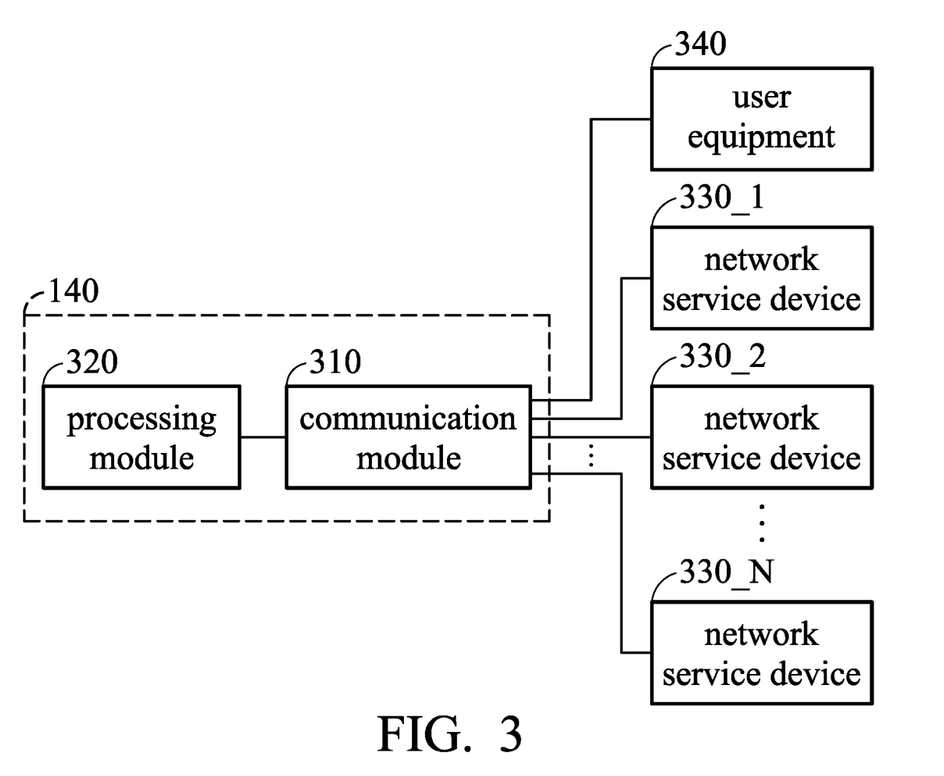
FIG. 3 is a schematic view of a session management device according to an embodiment of the present disclosure.

FIG. 3 is a schematic view of a session management device according to an embodiment of the present disclosure. Please refer to FIG. 3. The session management device 140 includes a communication module 310 and a processing module 320. The communication module 310 may be a signal transceiver for signal and data transmission with the network service device 110, the operation, administration and maintenance device 120 and the NF repository function device 130 as shown in FIG. 1.

The processing module 320 may be implemented by one or more programmable units and circuits having a storage function, such as a microprocessor, a microcontroller, a digital signal processing chip, and a field programmable gate array, etc. The processing module 320 may also be implemented by different electronic devices or integrated circuits, and the function implemented by the processing module 320 may be implemented by hardware and software.

The processing module 320 is coupled to the communication module 310. The processing module 320 is connected to a plurality of network service devices 330_1~330_N through the communication module 310 and obtains state messages of the network service devices 330_1~330_N, wherein N is a positive integer greater than 1. In the embodiment, at least one of the state messages of the network service devices 330_1~330_N includes an ultra-reliable low-latency communication (URLLC)-compliant message. For example, the state message of the network service device 330_1 includes the URLLC-compliant message, and it indicates that the network service device 330_1 is implemented in a way that is hardware-based. The state message of the network service devices 330_2~330_N do not include the URLLC-compliant message, and it indicates that the network service devices 330_2~330_N are not implemented in a way that is hardware-based (for example, the network service devices 330_2~330_N are implemented in a way that is software-based). However, the embodiment of the present disclosure is not limited thereto. The user may adjust the number of the network service devices including the URLLC-compliant message according to the requirements thereof.

In the embodiment, the processing module 320 of the session management device 140 may obtain the state messages of the network service devices 330_1~330_N through the network service devices 330_1~330_N, and may also obtain the state messages of the network service devices 330_1~330_N through the operation, administration and maintenance device 120 or the NF repository function device 130. The operation of obtaining the state messages of the network service devices 330_1~330_N by the processing module 320 may refer to the description of the embodiments of the FIG. 1 and FIG. 2, and the description thereof is not repeated herein.

Then, the processing module 320 is connected to the access and mobility management function (AMF) device (not shown) through the communication module 310 to receive a service request of the user equipment 340 through access and mobility management function device. The processing module 320 selects one of the network service devices 330_1~330_N to serve the service request according to the service request and the state messages of the network service devices 330_1~330_N. Therefore, the session management device 140 may select an appropriate network service device to serve the service request of the user equipment 340 according to different usage scenarios, so as to increase the convenience of use.

Furthermore, in some embodiments, after the processing module 320 receives the service request service of the user equipment 340, the processing module 320 may determine whether the service request is a delay-critical application. For example, the delay-critical application is used to indicate that a packet delay budget for processing a data packet is less than a predetermined time.

In the embodiment, the above data packet is, for example, a data packet of a general packet radio service (GPRS)

tunneling protocol (GTP). In addition, the predetermined time is, for example, 1 ms, but the embodiment of the present disclosure is not limited thereto. The user may also adjust the length of the predetermined time according to the requirements thereof, such as 0.5 ms, 0.2 ms, 0.1 ms, or less than 0.1 ms, etc.

When the processing module 320 determines that the service request is a delay-critical application, the processing module 320 may select the network service device that corresponds to the state message including the URLLC-compliant message to serve the service request. That is, the processing module 320 may preferentially select the network service device 330_1 (including the URLLC-compliant message) to serve the service request, so as to satisfy the request for the delay-critical application.

When the processing module 320 determines that the service request is not a delay-critical application, the processing module 320 selects the network service device that corresponds to the state message not including the URLLC-compliant message to serve the service request. That is, the processing module 320 may preferentially select one of the network service devices 330_2~330_N (not including the URLLC-compliant message) to serve the service request. Accordingly, the network service device 330_1 corresponding to the state message including the URLLC-compliant message is reserved for the use of the service request corresponding to the delay-critical application.

In some embodiments, after the processing module 320 obtains the service request of the user equipment 340, the processing module 320 may further determine whether one of the network service device 330_1~330_N conforms to the inclusion of the URLLC-compliant message and has a load state that is less than a predetermined value. In the embodiment, the predetermined value is, for example, 50%, 40% or 10%, but the embodiment of the present disclosure is not limited thereto.

At this time, assume that the network service device 330_1 includes the URLLC-compliant message and has a load state that is less than the predetermined value. When determining that the one of the network service devices 330_1~330_N conforms to the inclusion of the URLLC-compliant message and has a load state that is less than a predetermined value, the processing module 320 may select the one of the network service devices (such as network service device 330_1) that corresponds to the inclusion of the URLLC-compliant message and that has a load state that is less than the predetermined value to serve the service request. That is, when the session management device 140 receives the service request of the user equipment 340, the session management device 140 may preferentially select the network service device (such as the network service device 330_1) that conforms to the inclusion of the URLLC-compliant message and has a load state that is less than predetermined value to serve the service request.

In addition, assume that the network service device 330_1 includes the URLLC-compliant message, but its load state is not less than the predetermined value (i.e., the load state is greater than the predetermined value). When determining that none of the network service devices 330_1~330_N conforms to the inclusion of the URLLC-compliant message and has a load state that is less than the predetermined value, the processing module 320 may determine whether the service request is a delay-critical application. Then, when the processing module 320 determines that the service request is not the delay-critical application, the processing module 320 selects the network service device that corresponds to the state message not including the URLLC-compliant message to serve the service request. For example, the processing module 320 selects one of the network service devices 330_2~330_N to serve the service request.

In addition, when the processing module 320 determines that the service request is the delay-critical application, the processing module 320 selects a network service device that conforms to the inclusion of the URLLC-compliant message and has a load state that is greater than or equal to the predetermined value, such as the network service device 330_1, from among the network service devices 330_1~330_N. If the load state of the network service device is greater than or equal to the predetermined value, it indicates that the network service device may not be able to serve a new service request.

Then, the processing module 320 controls the selected network service device 330_1 (i.e., the network service device that corresponds to the state message including the URLLC-compliant message) to transfer a load amount to another network service device (such as the network service device 330_2), wherein a load of the load amount is, for example, a load of a non-delay-critical application. That is, the network service device 330_1 transfer a part of or all of the load amount (such as the non-delay-critical application) to another network service device 330_2, so that the network service device 330_2 serves the service request corresponding to the transferred load amount (such as the non-delay-critical application). Then, the network service device 330_1 may service the service request of the delay-critical application. Therefore, the data-processing speed may be increased and the requirement for the delay-critical application may be satisfied.

Figure 4:
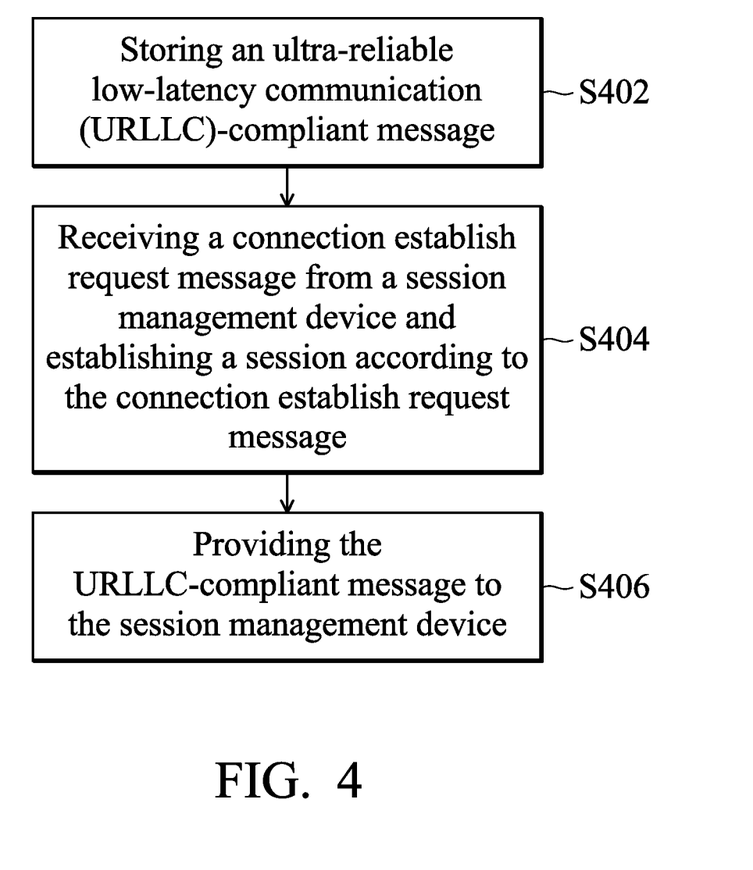
FIG. 4 is a flowchart of an operation method of a network service device according to an embodiment of the present disclosure.

FIG. 4 is a flowchart of an operation method of a network service device according to an embodiment of the present disclosure. In step S402, the method involves storing an ultra-reliable low-latency communication (URLLC)-compliant message. In step S404, the method involves receiving a connection establish request message from a session management device and establishing a session according to the connection establish request message. In step S406, the method involves providing the URLLC-compliant message to the session management device.

Figure 5:
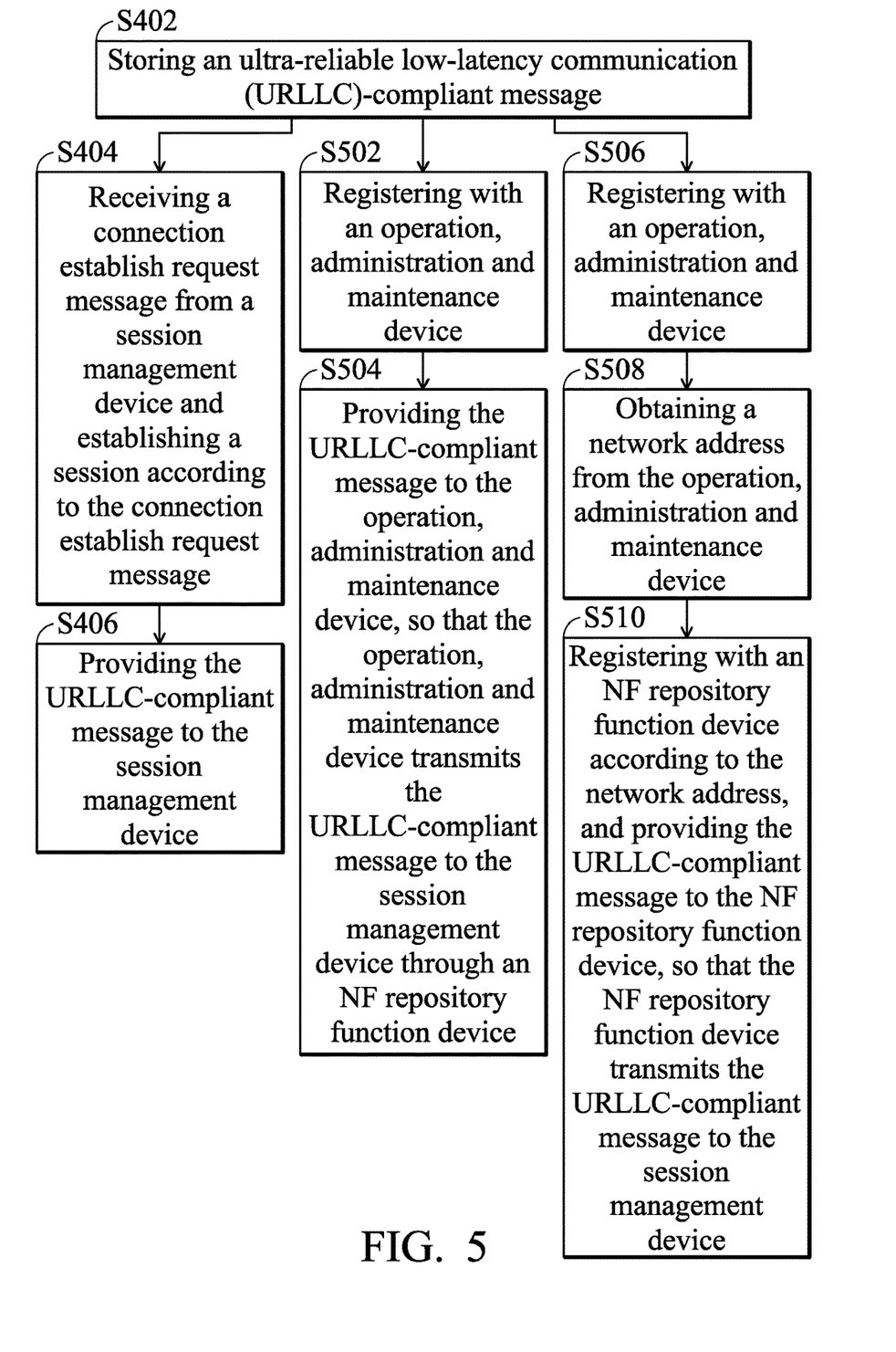
FIG. 5 is a flowchart of an operation method of a network service device according to another embodiment of the present disclosure.

FIG. 5 is a flowchart of an operation method of a network service device according to another embodiment of the present disclosure. In the embodiment, steps S402~S406 in FIG. 5 are equal to or similar to steps S402~S406 in FIG. 4. The description of steps S402~S406 in FIG. 5 may refer to the description of the embodiment of FIG. 4, and the description thereof is not repeated herein.

In step S502, the method involves registering with an operation, administration and maintenance device. In step S504, the method involves providing the URLLC-compliant message to the operation, administration and maintenance device, so that the operation, administration and maintenance device transmits the URLLC-compliant message to the session management device through an NF repository function device. In step S506, the method involves registering with an operation, administration and maintenance device. In step S508, the method involves obtaining a network address from the operation, administration and maintenance device. In step S510, the method involves registering with an NF repository function device according to the network address, and providing the URLLC-compliant message to the NF repository function device, so that the NF repository function device transmits the URLLC-compliant message to the session management device.

Figure 6:
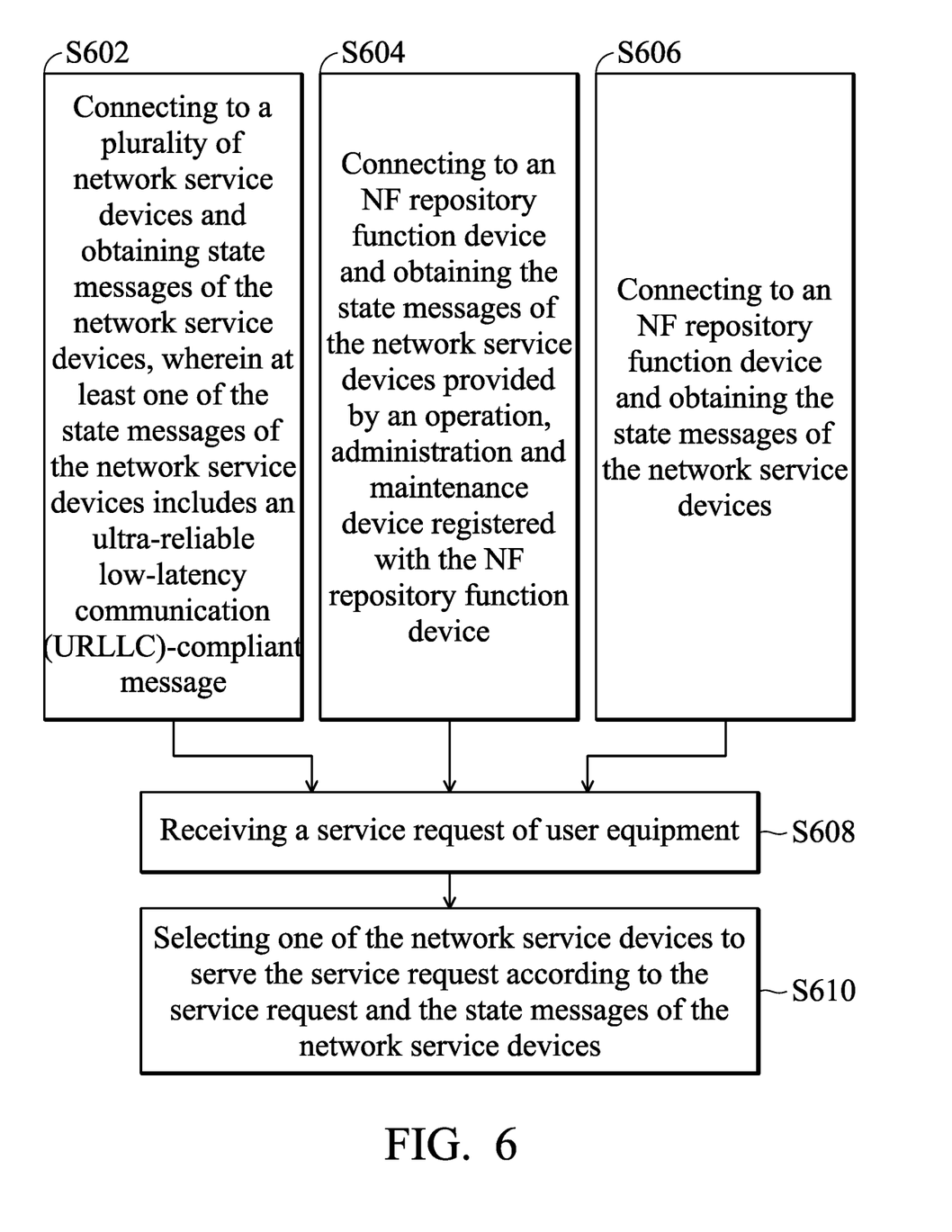
FIG. 6 is a flowchart of an operation method of a session management device according to an embodiment of the present disclosure.

FIG. 6 is a flowchart of an operation method of a session management device according to an embodiment of the present disclosure. In step S602, the method involves connecting to a plurality of network service devices and obtaining state messages of the network service devices, wherein at least one of the state messages of the network service devices includes an ultra-reliable low-latency communication (URLLC)-compliant message.

In step S604, the method involves connecting to an NF repository function device and obtaining the state messages of the network service devices provided by an operation, administration and maintenance device registered with the NF repository function device. In the embodiment, the network service devices register with and are connected to the operation, administration and maintenance device. In step S606, the method involves connecting to an NF repository function device and obtaining the state messages of the network service devices. In the embodiment, the network service devices register with and are connected to the NF repository function device.

In step S608, the method involves receiving a service request of user equipment. In step S610, the method involves selecting one of the network service devices to serve the service request according to the service request and the state messages of the network service devices.

Figure 7:
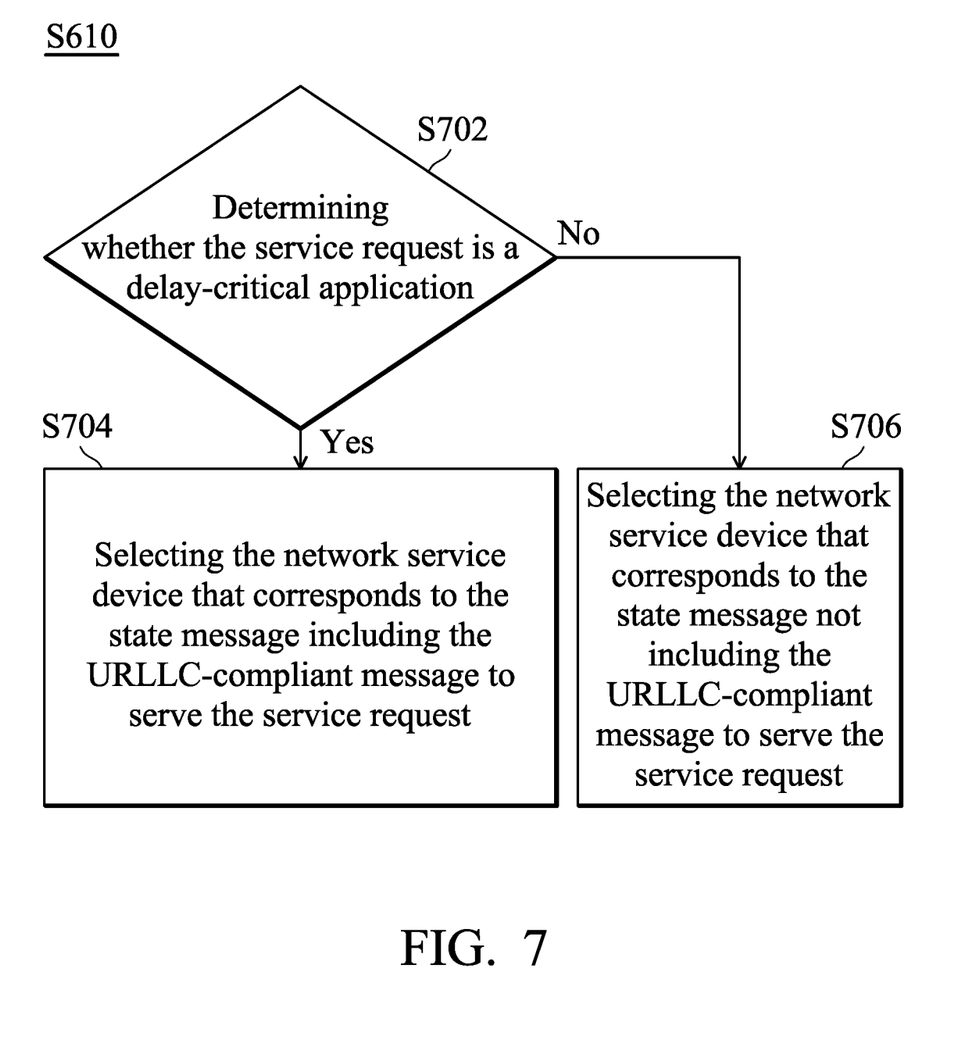
FIG. 7 is a detailed flowchart of step S610 in FIG. 6.

FIG. 7 is a detailed flowchart of step S610 in FIG. 6. In step S702, the method involves determining whether the service request is a delay-critical application. When determining that the service request is the delay-critical application, the method performs step S704. In step S704, the method involves selecting the network service device that corresponds to the state message including the URLLC-compliant message to serve the service request. When determining that the service request is not the delay-critical application, the method performs step S706. In step S706, the method involves selecting the network service device that corresponds to the state message not including the URLLC-compliant message to serve the service request.

Figure 8A:
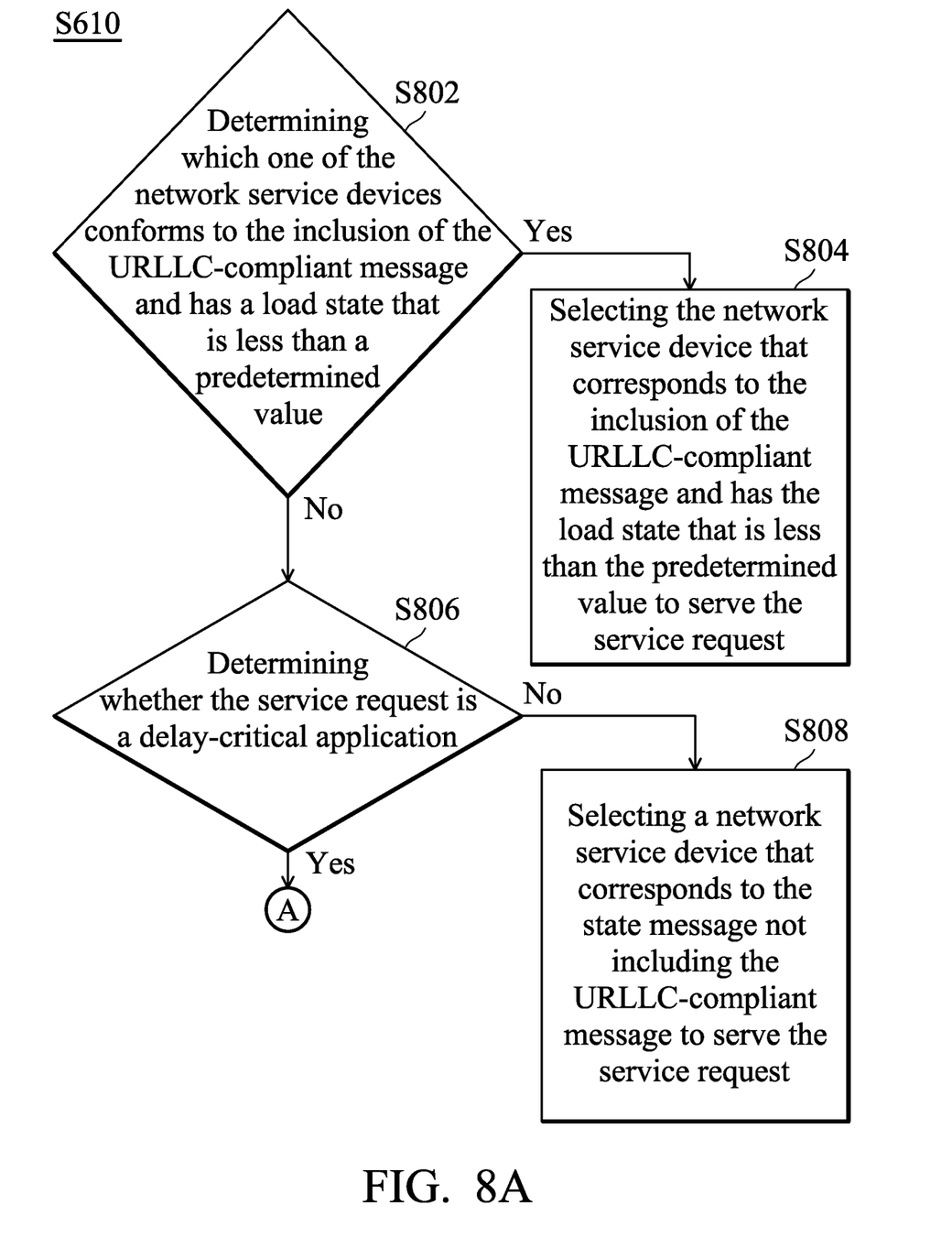
FIGS. 8A and 8B are another detailed flowchart of step S610 in FIG. 6.
Figure 8B:
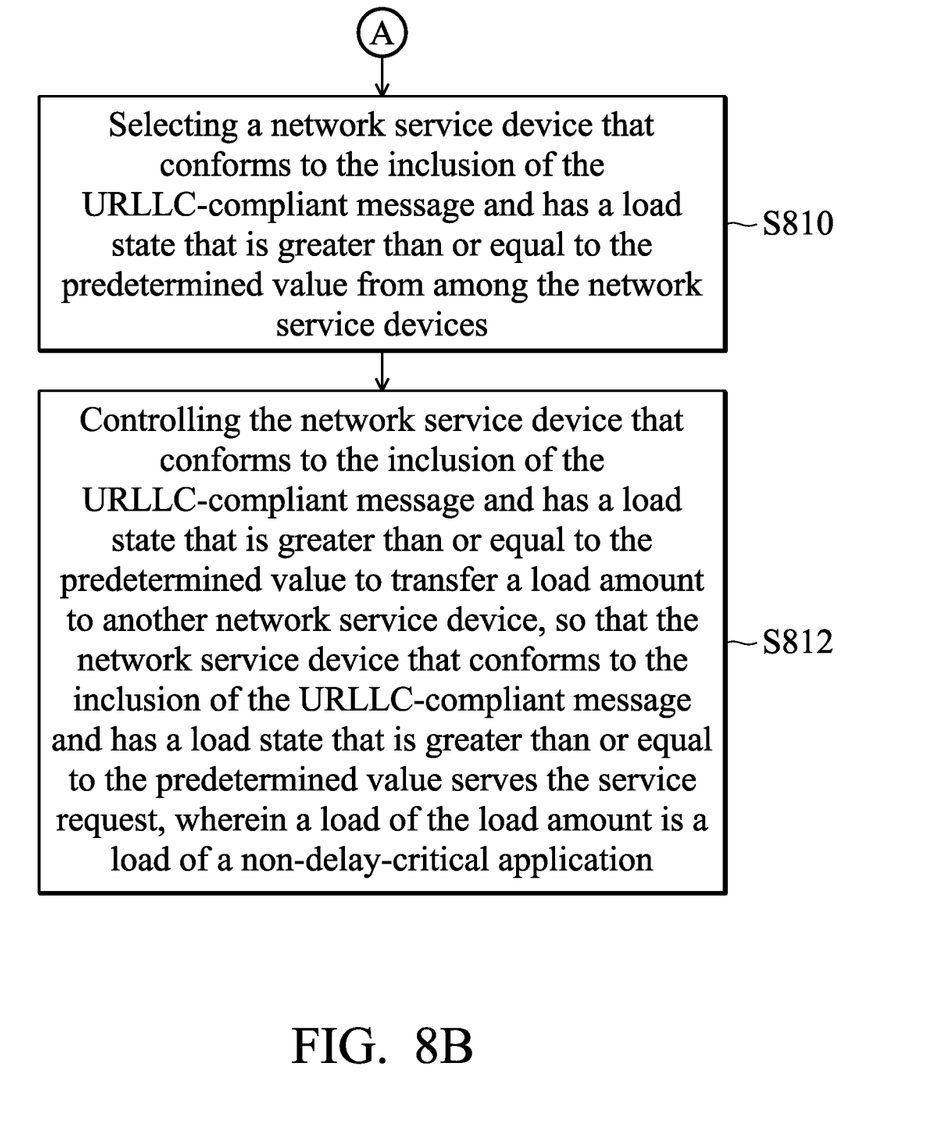

FIGS. 8A and 8B are another detailed flowchart of step S610 in FIG. 6. In step S802, the method involves determining which one of the network service devices conforms to the inclusion of the URLLC-compliant message and has a load state that is less than a predetermined value. When determining that the one of the network service devices conforms to the inclusion of the URLLC-compliant message and has a load state that is less than the predetermined value, the method performs step S804. In step S804, the method involves selecting the network service device that corresponds to the inclusion of the URLLC-compliant message and has the load state that is less than the predetermined value to serve the service request. When none of the network service devices conforms to the inclusion of the URLLC-compliant message and has a load state that is less than the predetermined value, the method performs step S806. In step S806, the method involves determining whether the service request is a delay-critical application.

When determining that the service request is not the delay-critical application, the method performs step S808. In step S808, the method involves selecting a network service device that corresponds to the state message not including the URLLC-compliant message to serve the service request. When determining that the service request is the delay-critical application, the method performs step S810. In step S810, the method involves selecting a network service device that conforms to the inclusion of the URLLC-compliant message and has a load state that is greater than or equal to the predetermined value from among the network service devices.

In step S812, the method involves controlling the network service device that conforms to the inclusion of the URLLC-compliant message and has a load state that is greater than or equal to the predetermined value to transfer a load amount to another network service device, so that the network service device that conforms to the inclusion of the URLLC-compliant message and has a load state that is greater than or equal to the predetermined value serves the service request, wherein a load of the load amount is a load of a non-delay-critical application.

It should be noted that the order of the steps of FIG. 1, FIG. 4, FIG. 5, FIG. 6, FIG. 7, FIG. 8A and FIG. 8B is only for illustrative purpose, but not intended to limit the order of the steps of the present disclosure. The user may change the order of the steps above according the requirement thereof. The flowcharts described above may add additional steps or use fewer steps without departing from the spirit and scope of the present disclosure.

In summary, according to the network service device, the session management device and the operation methods thereof disclosed by the present disclosure, the URLLC-compliant message (indicating that the network service device has URLLC capability and is implemented in a way that is hardware-based) stored in the network service device is provided to the session management device, so that the session management device may select the appropriate network service device to serve the service request according to the service request of the user equipment and the state messages of the network service devices. Therefore, the information of the network service device may be effectively provided, and the data-processing speed is increased and the latency time is decreased (for example, less than 1 ms).

In addition, the URLLC-compliant message stored in the network service device may also be provided to the session management device through the operation, administration and maintenance device or the NF repository function device, so as to increase the convenience of use. Furthermore, the session management device may determine whether the service request of the user equipment is the delay-critical application to serve as a basic of preferentially selecting the network service device including the URLLC-compliant message to serve the service request. Moreover, the session management device may select to adjust the load amount (such as the non-delay-critical application) of the network service device or select other network service devices to serve the service request according to the load state of the network service device. Therefore, the requirement for delay-critical application may be satisfied, and the data-processing speed is increased and the latency time is decreased.

While the disclosure has been described by way of example and in terms of the embodiments, it should be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A session management device, comprising:
a communication module; and
a processing module, coupled to the communication module, wherein the processing module is connected to a plurality of network service devices through the communication module and obtains state messages of the network service devices, at least one of the state messages of the network service devices includes an ultra-reliable low-latency communication (URLLC)-compliant message and the URLLC-compliant message indicates that a network service device has a capability of URLLC, and the processing module receives a service request of user equipment and selects one of the network service devices to serve the service request according to the service request and the state messages of the network service devices;

wherein the processing module is further connected to an NF repository function device through the communication module and obtains the state messages of the network service devices, wherein the network service devices register with and are connected to the NF repository function device;

wherein the processing module further determines whether the service request is a delay-critical application, when the processing module determines that the service request is the delay-critical application, the processing module selects a network service device that corresponds to a state message includes the URLLC-compliant message to meet the service request, and when the processing module determines that the service request is not the delay-critical application, the processing module selects a network service device that corresponds to a state message not comprising the URLLC-compliant message to serve the service request.

2. The session management device as claimed in claim 1, wherein the processing module is further connected to the NF repository function device through the communication module and obtains the state messages of the network service devices provided by an operation, administration and maintenance device registered with the NF repository function device, wherein the network service devices register with and are connected to the operation, administration and maintenance device.

3. The session management device as claimed in claim 1, wherein the URLLC-compliant message further indicates that the network service device has a characteristic of a hardware message.

4. An operation method of a session management device, comprising:

connecting to a plurality of network service devices and obtaining state messages of the network service devices, wherein at least one of the state messages of the network service devices comprises an ultra-reliable low-latency communication (URLLC)-compliant message, and the URLLC-compliant message indicates that a network service device has a capability of URLLC;

connecting to an NF repository function device and obtaining the state messages of the network service devices, wherein the network service devices register with and are connected to the NF repository function device;

receiving a service request of user equipment; and selecting one of the network service devices to serve the service request according to the service request and the state messages of the network service devices;

wherein the step of selecting one of the network service devices to serve the service request according to the service request and the state messages of the network service devices comprises:

determining whether the service request is a delay-critical application;

selecting a network service device that corresponds to a state message comprising the URLLC-compliant message to serve the service request when determining that the service request is the delay-critical application; and selecting a network service device that corresponds to a state message not comprising the URLLC-compliant message to serve the service request when determining that the service request is not the delay-critical application.

5. The operation method of the session management device as claimed in claim 4, further comprising:

connecting to the NF repository function device and obtaining the state messages of the network service devices provided by an operation, administration and maintenance device registered with the NF repository function device, wherein the network service devices register with and are connected to the operation, administration and maintenance device.

6. The operation method of the session management device as claimed in claim 4, wherein the URLLC-compliant message further indicates that the network service device has a characteristic of a hardware message.

7. A session management device, comprising:

a communication module; and a processing module, coupled to the communication module, wherein the processing module is connected to a plurality of network service devices through the communication module and obtains state messages of the network service devices, at least one of the state messages of the network service devices includes an ultra-reliable low-latency communication (URLLC)-compliant message and the URLLC-compliant message indicates that a network service device has a capability of URLLC, and the processing module receives a service request of user equipment and selects one of the network service devices to serve the service request according to the service request and the state messages of the network service devices;

wherein the processing module is further connected to an NF repository function device through the communication module and obtains the state messages of the network service devices, wherein the network service devices register with and are connected to the NF repository function device;

wherein the processing module further determines whether one of the network service devices conforms to inclusion of the URLLC-compliant message and has a load state that is less than a predetermined value, wherein when determining that one of the network service devices conforms to the inclusion of the URLLC-compliant message and has the load state that is less than the predetermined value, the processing module selects a network service device that corresponds to the inclusion of the URLLC-compliant message and has load state that is less than the predetermined value to serve the service request, wherein when none of the network service devices conforms to the inclusion of the URLLC-compliant message and has the load state that is less than the predetermined value, the processing module determines whether the service request is a delay-critical application, wherein when determining that the service request is not the delay-critical application, the processing module selects a network service device that corresponds to a state message not comprising the URLLC-compliant message to serve the service request, wherein when determining that the service request is the delay-critical application, the processing module selects a network service device that conforms to the inclusion of the URLLC-compliant message and has a load state that is greater than or equal to the predetermined value from among the network service devices, and wherein the processing module controls the network service device that conforms to the inclusion of the URLLC-compliant message and has a load state that is greater than or equal to the predetermined value to transfer a load amount to another network service device, so that the network service device that conforms to the inclusion of the URLLC-compliant message and has the load state that is greater than or equal to the predetermined value serves the service request, wherein a load of the load amount is a load of a non-delay-critical application.

8. The session management device as claimed in claim 7, wherein the processing module is further connected to the NF repository function device through the communication module and obtains the state messages of the network service devices provided by an operation, administration and maintenance device registered with the NF repository function device, wherein the network service devices register with and are connected to the operation, administration and maintenance device.

9. The session management device as claimed in claim 7, wherein the URLLC-compliant message further indicates that the network service device has a characteristic of a hardware message.

10. An operation method of a session management device, comprising:

connecting to a plurality of network service devices and obtaining state messages of the network service devices, wherein at least one of the state messages of the network service devices comprises an ultra-reliable low-latency communication (URLLC)-compliant message, and the URLLC-compliant message indicates that a network service device has a capability of URLLC;

connecting to an NF repository function device and obtaining the state messages of the network service devices, wherein the network service devices register with and are connected to the NF repository function device;

receiving a service request of user equipment; and selecting one of the network service devices to serve the service request according to the service request and the state messages of the network service devices;

wherein the step of selecting one of the network service devices to serve the service request according to the service request and the state messages of the network service devices comprises:

determining that one of the network service devices that conforms to the inclusion of the URLLC-compliant message and has a load state that is less than a predetermined value;

selecting a network service device that corresponds to the inclusion of the URLLC-compliant message and has the load state that is less than the predetermined value to serve the service request when determining that the one of the network service devices conforms to the inclusion of the URLLC-compliant message and has the load state that is less than the predetermined value;

determining whether the service request is a delay-critical application when none of the network service devices conforms to the inclusion of the URLLC-compliant message and has the load state that is less than the predetermined value;

selecting a network service device that corresponds to a state message not comprising the URLLC-compliant message to serve the service request when determining that the service request is not the delay-critical application;

selecting a network service device that conforms to the inclusion of the URLLC-compliant message and has a load state that is greater than or equal to the predetermined value from among the network service devices when determining that the service request is the delay-critical application; and controlling the network service device that conforms to the inclusion of the URLLC-compliant message and has the load state that is greater than or equal to the predetermined value to transfer a load amount to another network service device, so that the network service device that conforms to the inclusion of the URLLC-compliant message and has the load state that is greater than or equal to the predetermined value serves the service request, wherein a load of the load amount is a load of a non-delay-critical application.

11. The operation method of the session management device as claimed in claim 10, further comprising:

connecting to the NF repository function device and obtaining the state messages of the network service devices provided by an operation, administration and maintenance device registered with the NF repository function device, wherein the network service devices register with and are connected to the operation, administration and maintenance device.

12. The operation method of the session management device as claimed in claim 10, wherein the URLLC-compliant message further indicates that the network service device has a characteristic of a hardware message.

* * * * *